United States Patent Office 2,955,095
Patented Oct. 4, 1960

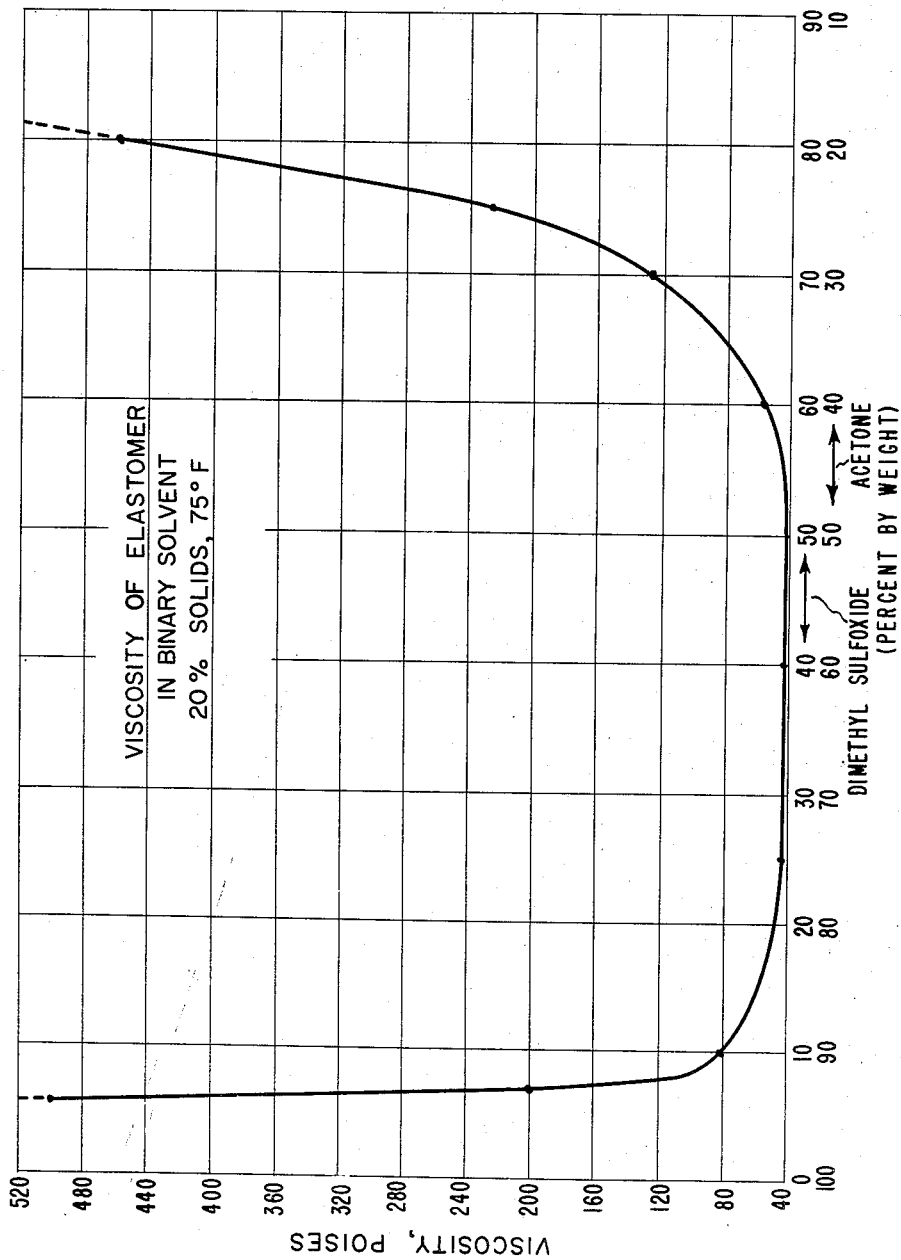

2,955,095

COMPOSITION COMPRISING CHAIN EXTENDED POLYURETHANE DISSOLVED IN DIALKYL SULFOXIDE AND A KETONE AND PROCESS OF COATING THEREWITH

Fred Gollob, Cornwall-on-Hudson, N.Y., assignor to E. I. du Pont de Nemours and Company, Wilmington, Del., a corporation of Delaware Filed Jan. 8, 1958, Ser. No. 707,812

6 Claims. (Cl. 260—30.8)

This invention relates to solutions of certain polyurethane elastomers, and more particularly to solutions of polyether-diisocyanate elastomers which are useful for making durable elastomer coated fabrics and other products.

The polyurethane elastomers of concern in this invention are those obtained by reactions involving a polyalkylene-ether glycol having a molecular weight of at least 750, an organic diisocyanate and a chain-extending compound containing active hydrogen atoms, such as, e.g., water, hydrogen sulfide or an organic compound containing hydrogen atoms attached to two different atoms in the molecule. Of particular concern are such elastomers in which water was the chain-extending compound because these are normally the most difficult to dissolve in desirable solvents.

These polyurethane elastomers, when properly compounded and cured, are known to possess a number of advantageous properties as compared to natural rubber and other synthetic rubbers, including excellent resistance to heat and cold, direct sunlight, oxygen, ozone, oil and other hydrocarbon solvents. Particularly remarkable is their abrasion resistance, which is 3 to 6 times that of natural rubber.

Although numerous attempts have been made to produce coated fabrics and other products from these elastomers by solution coating methods, such attempts were heretofore commercially unsuccessful because of the unavailability of a satisfactory solvent. Dimethyl formamide, the best candidate among the very limited number of previously known solvents for the uncured elastomers, has too high a boiling point for efficient production line drying. The high temperatures needed for rapid evaporation of dimethyl formamide from the coating are inclined to damage the elastomer as well as heat sensitive fabric substrates. In addition, this solvent tends to destroy isocyanate curing agents present in the coating composition by catalyzing the reaction between the curing agent and traces of water which are drawn into the solution by the hygroscopic solvent.

All prior attempts to make solution coating compositions of these polyurethane elastomers at or near ordinary room temperatures with inexpensive low boiling solvents have failed. When heated solvents were tried they were found wanting in solvency as well as impractical to use on a production basis.

It is therefore the primary object of this invention to provide a solution of the above defined polyurethane elastomers in a solvent which is volatile at relatively low temperatures and which causes no adverse reactions in the solution. A further object is the provision of a solution of the elastomers having a room-temperature viscosity which permits application to a fabric substrate by an ordinary doctor knife coating method. Other important objects will be readily apparent from the following description of the invention.

The objects of this invention are accomplished by using a mixture of a dialkyl sulfoxide and a ketone in certain proportions as the solvent for the specified polyurethane elastomers. Quite unexpectedly, there is a synergistic action between the ketone and the dialkyl sulfoxide of this novel binary solvent, each of which is incapable alone of dissolving the elastomers, which allows the aforementioned objects to be achieved.

In the accompanying drawing the single figure is a graph in which the viscosity obtained by dissolving 20 parts by weight of the elastomer in 80 parts by weight of binary solvent mixtures described in the following specific examples is plotted against the proportion of acetone and dimethyl sulfoxide present in the binary solvent mixture. The viscosity measurements are made at 75° F.

The following table is intended to exemplify the invention and not to limit it in any way. Parts are by weight unless otherwise specified.

| Example | I | II | III | IV | V | VI | VII | VIII | IX | X | XI |
|---|---|---|---|---|---|---|---|---|---|---|---|
| Parts dimethyl sulfoxide | 4 (5) | 4.8 (6) | 5.6 (7) | 8(10) | 20(25) | 32(40) | 48(60) | 56(70) | 60(75) | 64(80) | 72(90) |
| Parts acetone | 76(95) | 75.2(94) | 74.4(93) | 72(90) | 60(75) | 48(60) | 32(40) | 24(30) | 20(25) | 16(20) | 8(10) |
| Parts elastomer | 20 | 20 | 20 | 20 | 20 | 20 | 20 | 20 | 20 | 20 | 20 |
| | 100 | 100 | 100 | 100 | 100 | 100 | 100 | 100 | 100 | 100 | 100 |
| Viscosity in Poises at 75° F. Measured with Gardner-Holt viscosity tubes | (¹) | 500 | 200 | 80 | 40 | 40 | 55 | 125 | 230 | 460 | (¹) |

¹ Does not dissolve.

The figures in the parentheses in the above table represent the percent dimethyl sulfoxide and acetone based on the combined weight of the two solvents.

The uncured polyurethane elastomer used in making the solutions of the above examples is prepared by mixing together in a Werner-Pfleiderer mixer at 70–80° C. for 3 hours one molar proportion of a polytetramethyleneether glycol of molecular weight of 3230 and 2.1 molar proportions of 2,4-tolylene diisocyanate. Then 5.11 molar proportions of water are added and mixing is continued for 33 minutes, the temperature rising to about 135° C. At the end of this time the reaction mass is in the form of rubbery chunks. It is removed from the mixer and put on a rubber roll mill where 0.74 part of piperidene is added as a stabilizer for each 100 parts, by weight, of the polymer. When thoroughly mixed, the stabilized elastomer is sheeted off the mill and cut into pieces of convenient size for dissolving.

In making the solutions of the specific examples, 20 parts by weight of the elastomer are added to 80 parts by weight of each solvent mixture illustrated in the above table. Solution of the elastomer is substantially complete after 4 hours of stirring at 75° F. in Examples II through X. With inoperable Examples I and XI, there is no apparent tendency of the elastomer to dissolve after 4 hours of stirring at 75° F.

The solutions of Examples II through X are of suitable viscosity for spreading on fabric substrates by well known doctor knife coating methods followed by forced drying at an elevated temperature to produce useful polyurethane elastomer coated fabrics.

Other coating methods, such as spraying, rolling and brushing, are also useful for applying the solutions to various substrates.

These solutions are sufficiently stable to be stored for prolonged periods before use. They can be marketed in unmodified or compounded form as coating compositions or adhesives for application to a wide variety of substrates, e.g., woven and non-woven fabrics, metal, wood or paper.

A suitable curing agent for the elastomer can be added to the solution before use. For instance, 4 parts by weight of di(3-isocyanato-4-methylphenyl) urea for each 100 parts of elastomer, when mixed into the solution, provides excellent curing characteristics.

When woven textile fabrics are coated with the solutions of this invention and oven cured, the resulting elastomer coated fabrics are useful as paulins, diaphragms and gaskets. The solutions are also useful for impregnating non-woven fibrous sheets in the production of leather-like products.

Polytetramethyleneether glycol is the preferred glycol for reacting with the 2,4-tolylene diisocyanate to prepare the polyurethane elastomers useful in carrying out this invention. Other polyalkyleneether glycols which are representative of the class which can be used in preparing the polymeric elastomers include polyethyleneether glycol, polypropyleneether glycol, 1,2-polydimethylethyleneether glycol and polydecamethyleneether glycol.

The term "polyalkyleneether glycol" as used throughout the specification and claims refers to polyalkyleneether glycols containing terminal hydroxy groups. These compounds are ordinarily derived from the polymerization of cyclic ethers such as alkylene oxides or dioxolane or from the condensation of glycols. They are sometimes represented by the formula $HO(RO)_nH$, in which R stands for an alkylene radical and $n$ is an integer greater than 1. In the polyethers useful in preparing the polymeric elastomers of this invention, "$n$" is sufficiently large that the polyalkyleneether glycol has a molecular weight of at least 750 and may be as high as 10,000. Polyalkyleneether glycols having a molecular weight of 750 to 3500 are preferred. Not all the alkylene radicals present need be the same. Polyglycols formed by the copolymerization of a mixture of different alkylene oxides or glycols can be used, or the polyglycol can be derived from a cyclic ether such as dioxolane, which results in a product having the formula $$HO(CH_2OC_2H_4)_nH$$

Examples of compounds which contain diverse alkylene radicals and which are useful in the preparation of elastomers are those polyethers described in United States Patent No. 2,492,955 to Ballard et al. which have molecular weights in the desired range. The alkylene radicals may be straight-chain or may have a branched chain as the compound known as 1,2-polydimethylethyleneether glycol, which has the formula

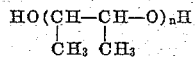

Any of a wide variety of organic diisocyanates can be employed in preparing the polymeric elastomers of this invention including aromatic, aliphatic and cycloaliphatic diisocyanates, and combinations of these types. Representative compounds include 2,4-tolylene diisocyanate, m-phenylene diisocyanate, 4-chloro-1,3-phenylene diisocyanate, 4,4'-biphenylene diisocyanate, 1,5-naphthylene diisocyanate, 1,4-tetramethylene diisocyanate, 1,6-hexamethylene diisocyanate, 1,10-decamethylene diisocyanate, 1,4-cyclohexylene diisocyanate, 4,4'-methylene-bis-(cyclohexyl isocyanate) and 1,5-tetrahydronaphthylene diisocyanate. Arylene diisocyanates, i.e., those in which each of the two isocyanate groups is attached directly to an aromatic ring, are preferred. In general they react more rapidly with the polyalkyleneether glycols than do the alkylene diisocyanates. Compounds such as 2,4-tolylene diisocyanate in which the two isocyanate groups differ in reactivity are particularly desirable. The diisocyanates can contain other substituents, although those which are free from reactive groups other than the two isocyanate groups are ordinarily preferred. In the case of the aromatic compounds, the isocyanate groups can be attached either to the same or to different rings. Dimers of the monomeric diisocyanates and di(isocianatoaryl) ureas such as di(3-isocyanato-4-methylphenyl) urea, which are the subject of U.S. Patent 2,757,185 to Eric Barthel, Jr., may be used.

When the uncured elastomer is free of or contains only a small number of free isocyanate groups, either because of the proportions of reactants used or because a stabilizer is present, it is necessary to add an additional amount of an organic polyisocyanate, usually a diisocyanate, to accomplish curing. Any of the diisocyanates previously described as useful in the initial elastomer-forming reaction are suitable as curing agents. Diisocyanate dimers and such compounds as di(3-isocyanato-4-methylphenyl) urea are especially convenient curing agents. The addition of 1 to 20%, preferably 4 to 8%, of a diisocyanate, based on the weight of uncured elastomer, is adequate for curing the elastomers when stabilized. The curing agent can either be blended with the solid elastomer on a rubber mill or mixed with the elastomer solution prior to use.

It is not intended that the solutions in accordance with this invention should be restricted to any particular limits of elastomer concentration. Although the solutions of the examples contain 20% by weight of the elastomer, it will be understood that solutions of greater or lower concentration of elastomer are also feasible and useful. With any particular solvent blend and any given elastomer batch, the solution viscosity will increase with increasing elastomer content and vice versa. For fabric coating purposes the solutions containing from about 10% to about 40% by weight of the elastomer are usually preferred.

Since acetone is much more volatile than dimethyl sulfoxide, faster drying rates are obtained in coating operations with the solutions of this invention when the solvent blend contains a minimum of the dimethyl sulfoxide. It is therefore usually preferable to employ the fastest drying solvent blend (i.e., the maximum proportion of acetone) which will produce an operable viscosity. Fabrics can usually be most conveniently knife-coated when the ratio of acetone to dimethyl sulfoxide in the elastomer solution is greater than 90/10, but less than 95/5.

It will be noted in inoperable Examples I and XI that the elastomer is substantially insoluble at 20% concentration when the acetone/dimethyl sulfoxide ratio reaches about 95/5 on the one hand and when the dimethyl sulfoxide/acetone ratio reaches about 85/15 on the other hand. The maximum operable proportion of ketone in the binary solvent will vary slightly in direct proportion to the elastomer concentration. Therefore, as the elastomer content is dropped below 20%, the useful range for the ratio of the ketone to dialkyl sulfoxide can be increased. For example, at 7% by weight of elastomer, solution at a useful viscosity is obtained when the solution contains 96% to 15% ketone and 4% to 85% dialkyl sulfoxide. The percentage figures for the solvents being based on the combined weight of the two solvents.

The ketone component of the synergistic binary solvent of this invention can include one or more of the following: acetone, methyl ethyl ketone, methyl isobutyl ketone, and cyclohexanone.

While not preferred, other dialkyl sulfoxides can be substituted for the dimethyl sulfoxide, such as, e.g., the diethyl, dipropyl and dibutyl sulfoxides. Dimethyl sulfoxide is preferred for its superior stability and non-interference with coating properties.

In addition to the essential binary solvent and elastomer described above, the solutions in accordance with this invention can contain such well known additives as pigments, fillers, plasticizers, and stabilizers.

The solutions of this invention have several important advantages which will be readily apparent to persons familiar with the art of making solution coating compositions based on the specified polyurethane elastomers. For example, isocyanate type curing agents for the elastomer can be present in the solutions without being decomposed as is encountered with dimethyl formamide. Furthermore, the preferred binary solvent of these novel solutions is less expensive, less toxic and more easily evaporated than previously available solvents. Thus it is practical for the first time to make coated fabrics and other products from these elastomers by solution coating methods.

While there are above disclosed but a limited number of embodiments of the structure, process and product of the invention herein presented, it is possible to produce still other embodiments without departing from the inventive concept herein disclosed, and it is desired therefore that only such limitations be imposed on the appended claims as are stated therein, or required by the prior art.

I claim:

1. A new composition of matter comprising a solution of a polyurethane elastomer which is the reaction product of a polyalkylene ether glycol having a molecular weight of at least 750 and represented by the formula $HO(RO)_nH$ in which R represents an alkylene radical and $n$ an integer greater than 1, an organic diisocyanate and a chain extending compound containing active hydrogen atoms selected from the group consisting of water and hydrogen sulfide, said elastomer being dissolved in a liquid comprising 4 to 85% of a dialkyl sulfoxide selected from the group consisting of dimethyl sulfoxide, diethyl sulfoxide, dipropyl sulfoxide and dibutyl sulfoxide, and 96% to 15% of a ketone selected from the group consisting of methyl ethyl ketone, acetone, methyl isobutyl ketone and cyclohexanone, said percentage figures being based on the combined weight of the dialkyl sulfoxide and the ketone.

2. A solution as set forth in claim 1 wherein the dialkyl sulfoxide is dimethyl sulfoxide.

3. A solution as set forth in claim 1 wherein the ketone is acetone.

4. A solution as set forth in claim 2 wherein the ketone is acetone.

5. A solution as set forth in claim 1 wherein the chain extending compound is water.

6. The process which comprises dissolving a polyurethane elastomer in a solvent mixture comprising 4 to 85 parts by weight of a dialkyl sulfoxide selected from the group consisting of dimethyl sulfoxide, diethyl sulfoxide, dipropyl sulfoxide and dibutyl sulfoxide, and 96–15 parts by weight of a ketone selected from the group consisting of methyl ethyl ketone, acetone, methyl isobutyl ketone and cyclohexanone, spreading the solution on a fabric substrate, and heating the coated fabric to dissipate the volatile components, said polyurethane elastomer being the reaction product of a polyalkylene ether glycol having a molecular weight of at least 750 and represented by the formula $HO(RO)_nH$ in which R represents an alkylene radical and $n$ is an integer greater than 1, an organic diisocyanate and a chain extending compound containing active hydrogen atoms selected from the group consisting of water, and hydrogen sulfide.

References Cited in the file of this patent

UNITED STATES PATENTS 2,843,568    Benning et al. _____ July 15, 1958